Figures 1, 2:
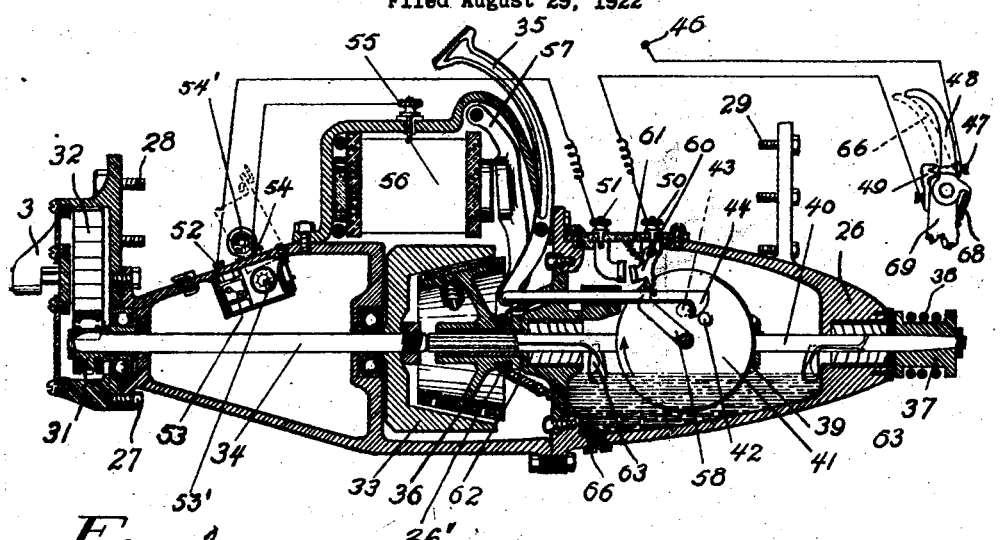

Jan. 19, 1926. 1,570,414
S. H. SUMBULIAN
AUTOMATIC CLUTCH
Filed August 29, 1922

Witnesses:

Inventor:

Patented Jan. 19, 1926.

1,570,414

UNITED STATES PATENT OFFICE.

SARKIS H. SUMBULIAN, BY CHANGE OF NAME SARKIS HAIG BEULAN, OF SAN FRANCISCO, CALIFORNIA.

AUTOMATIC CLUTCH.

Application filed August 29, 1922. Serial No. 585,103.

*To all whom it may concern:*

Be it known that I, SARKIS H. SUMBULIAN, a citizen of the United States, residing at San Francisco, county of San Francisco, and State of California, have invented new and useful Improvements in Automatic Clutches, of which the following is a specification.

This invention relates to new and useful improvements in clutches and particularly to clutches adapted for use with orchard cultivators.

One object of the invention is to provide a clutch, for use with a tractor drawn orchard cultivator, which will automatically withdraw the cultivator hoe out of the line of travel thereof, when said hoe has approached within a predetermined distance from the roots or stalks of trees or vines.

Another object is to provide an electro-magnetically operated means for throwing in the clutch, and controlled by a circuit closer disposed adjacent the cultivator hoe and which is adapted to engage with a root or stalk for closing the circuit.

Another object is to provide a clutch which is electromagnetically thrown into operative position, and which is mechanically released, while at the same time, the mechanical means breaks the circuit at a point remote from the circuit closer.

Other objects and advantages will be apparent from the following description when taken in connection with the accompanying drawing.

In the accompanying drawings, Fig. 1 is a vertical sectional view of the electromagnetic clutch assembly showing the arrangement of the combination clutch and the complete diagram of the wiring system.

Fig. 2 is a rear view of the orchard cultivator, showing the two sprocket covers removed.

Referring particularly to the accompanying drawing, 1 represents a supporting carriage frame, having any suitable means for attachment to a tractor (not shown).

Rod 5, extending thru the raised portions of said frame, is secured to a thrust clamp 6, resting on the outwardly extended arms 7 of push rod 8, which controls the depth of running wheel 9 by thrusting the collar of wheel axle 10. Adjusting lever 11 mounted on the toothed segment 12, is secured to the gear shifter plate of tractor (not shown) with bolts 13, Fig. 2. An upwardly extended member 14 connected to rod 5, transmits movement from the hand lever 11 by means of the tie member 15. A rearward movement of lever 11 elevates the hoe above the soil, Fig. 2, while a forward movement of said lever elevates the thrust rod 8, against the resistance of spring 16, permitting the hoe to drop to the desired depth into the soil. The cap 17 is adapted to screw on the frame 1, to protect the upper portion of the wheel axle 10 from dust. The frame 1 has a hollow tube for the reception of the plunger shaft 18.

Attached to the outer end of the plunger 18, is a downwardly and outwardly extending beam 21, supporting the hoe 22, the plunger 18 and all parts mounted thereon being held in outward position by means of two large springs 24, attached to the inner end of the plunger shaft, and to the frame 1.

Dustproof bags 25, containing lubricating grease, are secured to the opposite ends of the tube to enclose the ends of the plunger shaft 18 while in operation, and for the purpose of excluding dust, and the like from the bearings, as well as to supply the proper amount of lubricant to the movable parts.

The rear end of the clutch housing 26 is secured to the chain housing 3 by means of the bolts 27, said chain housing being attached to the tractor by means of the bolts 28, while the forward end of the clutch housing is suspended by means of the bolts 29, as seen in Figure 1. A sprocket wheel 30, secured on the rear end of the tractor worm (not shown), drives the clutch sprocket 31, which is secured to the adjacent end of the shaft 34, mounted in the housing 26, by means of the chain 32, the fly wheel 33 being also mounted on the shaft 34. A forward movement of the foot pedal 35 frictionally engages the cone 36 with the fly wheel 33, causing the rotation of the pulley 37, and the inward movement of the plunger, by means of a connecting cable 38. Timing gears 39, mounted on the driven shaft 40, operate the gear 41, which has a laterally projecting pin 42, said gear 41 rotating once in the direction of the arrow, indicated in the drawing, when the pin 42 engages with the hooked end of the rod 44 disposed through the housing and connected to the clutch collar 36' and to the lower end of the pedal lever 35. The gears are proportioned to release the clutch when the plunger is drawn inwardly to its maximum position.

The circuit is taken from the magneto of the tractor, through the terminal plug 46, and is connected to the switch post 47, on the arm 48, passing through the receiving switch post 49 to the circuit breaker posts 50 and 51, to post 52 of the current rectifier, which is adjacent and properly connected to the rheostat 53', leaving the post 54, of the meter 54', and passing to the magnet post 55, and magnet 56. This causes the pivoted armature 57 to be attracted thereto. This couples the shaft 34 to the shaft 40, with the result that the gear 41 will be rotated. An arm 58, having an insulated tip, is formed on the gear 41, and is arranged for engagement with, and movement of, the circuit breaker arm 60, which arm is pivotally supported on the housing and normally held against the stationary contact 51 by the spring 61, said contact 51 being also mounted on the housing. The breaking of the circuit at 51—60, deenergizes the magnet 56, and permits the springs 62 to disengage the cone 36 from the fly wheel 33. Splashers 63, mounted on the shaft 40, and rotatable therewith, assure a continuous lubrication to the clutch sleeve and bearings as shown. The rectifier and rheostat, enclosed in the rear compartment of the housing 26, may be raised for adjustments. Plug 66 is adapted to drain impure oil from the housing 26. All of the switches and posts are properly insulated to insure perfect ignition.

A slight rearward movement of the switch arm 48, upon coming into contact with a vine, closes the circuit at 47—49, which energizes the magnet 56, drawing the armature 57 thereto, which results in the movement of the cone 36 into frictional engagement with the fly wheel 33. This couples the shafts 34 and 40 so that they rotate as a unit, resulting in the rotation of the wheel 41, and the winding of the cable 38 on the drum 37. This winding of the cable draws the rod 18 inwardly, against the tension of the springs 24, and moves the hoe away from the vine, and to one side thereof. The continued rotation of the wheel 40 brings the pin 42 into engagement with the hooked end of the rod 44, resulting in the longitudinal movement of said rod and the withdrawing of the cone from the fly wheel, thus effecting disengagement of the shafts 34 and 40. Immediately upon release of the cone, from the fly wheel, the springs 24 project the hoe outward into position for further operation on the soil, and the shaft 40 and gear 41 are rotated in a reverse direction, due to the unwinding action of the cable 38. The disengagement of the clutch cone and the breaking of the circuit at 51—60 are accomplished simultaneously.

I claim as my invention:

1. An automatic clutch mechanism including alined shafts, means for coupling the shafts, means for constantly driving one of the shafts, means for actuating the coupling means, and means operable by the first shaft for simultaneously releasing the coupling means and releasing the coupling actuating means.

2. The combination with a drive shaft, of a driven shaft, a clutch for coupling the shafts, an electric circuit, a circuit closer in the circuit, a clutch operating means included in the circuit, and means operable by the driven shaft for simultaneously opening the circuit closer and releasing the clutch.

3. A clutch mechanism including alined shafts, a clutch for coupling the shaft, electro-magnetically operable means for throwing in the clutch, a circuit closer, a circuit breaker, means operable by one of the shafts for throwing out the clutch, and means operable by said shaft for operating the circuit breaker simultaneously with the throwing out of the clutch.

4. The combination with a drive shaft of a clutch mechanism including a winding shaft, clutchable with the drive shaft, an electric circuit, an electro-magnet in the circuit and including an armature operatively connected with the shiftable clutch member of the clutch mechanism, for moving the clutch member in one direction, a circuit breaker, a circuit closer, and means connected with the armature and operable by the winding shaft for simultaneously actuating the circuit breaker and withdrawing the clutch.

5. The combination with a drive shaft and a driven shaft, of a clutch between the shafts, an electric circuit, an electromagnet, a circuit closer, and a circuit breaker included in the circuit, means operable by the electromagnet for engaging the clutch, a rotatable element driven by the driven shaft, means operable by the rotatable element for disengaging the clutch, and means operable by the rotatable element for operating the circuit breaker.

6. The combination with a drive shaft and a driven shaft, of a clutch between the shafts, an electric circuit including an electromagnet and a circuit breaker, the electromagnet including an armature operatively connected with the clutch for shifting the latter into engagement, a rotatable element driven by the driven shaft and having a laterally extending pin and projection, and a hooked arm carried by the armature and clutch for engagement by and movement with the rotatable element to disengage the clutch, said projection simultaneously engaging with and actuating the circuit breaker.

In testimony whereof I affix my signature.

SARKIS H. SUMBULIAN.